United States Patent

[11] 3,554,355

| [72] | Inventor | Alfred Sheldon Berg<br>508 W. Oakland Ave., Austin, Minn. 55912 |
|---|---|---|
| [21] | Appl. No. | 717,613 |
| [22] | Filed | Apr. 1, 1968 |
| [45] | Patented | Jan. 12, 1971 |

[54] FEED DISTRIBUTING APPARATUS
7 Claims, 9 Drawing Figs.

[52] U.S. Cl. .................................................. 198/36, 119/52
[51] Int. Cl. ..................................................... A01k 5/02, B65g 65/28
[50] Field of Search ............................................ 198/36, 208, 139, 68, 184, 185; 119/52, 56, 51.11

[56] References Cited
UNITED STATES PATENTS
452,191  5/1891  Oliver........................... 198/208
3,289,815  12/1966  Richter........................ 198/139

*Primary Examiner*—Edward A. Sroka
*Attorney*—Merchant and Gould

ABSTRACT: A pair of elongated tracks one mounted in vertical overlying relationship to the other, each having a carriage thereon with a pulley rotatably mounted therein for movement about a horizontal axis transverse to the tracks, chains extending between the carriages around guiding and power sprockets at one end of the tracks and an endless belt extending around the pulleys in the carriages and around pulleys and power means at the other end of the tracks so that a lower portion of the endless belt is substantially horizontal for receiving feed or other particulate matter thereon and rotation of the belt causes the feed to be dropped off the end of the horizontal portion while movement of the chains causes the carriages and, consequently, the end of the horizontal portion of the belt to move horizontally along the track, thereby, distributing the feed or particulate matter.

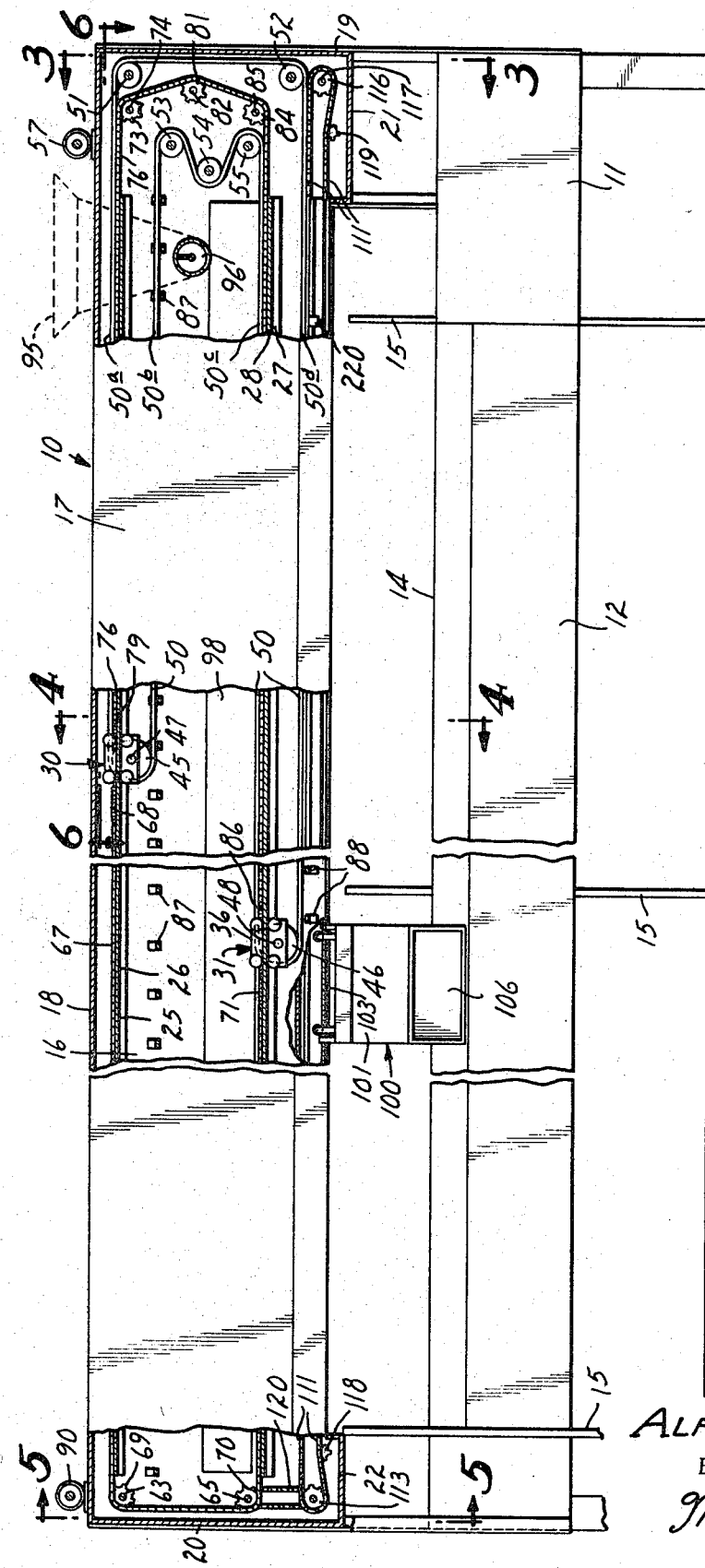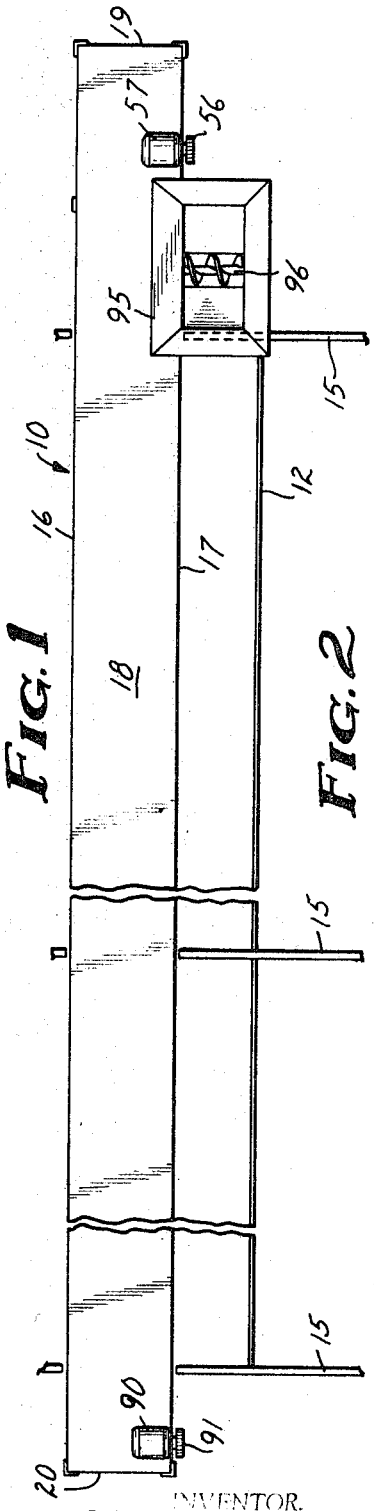

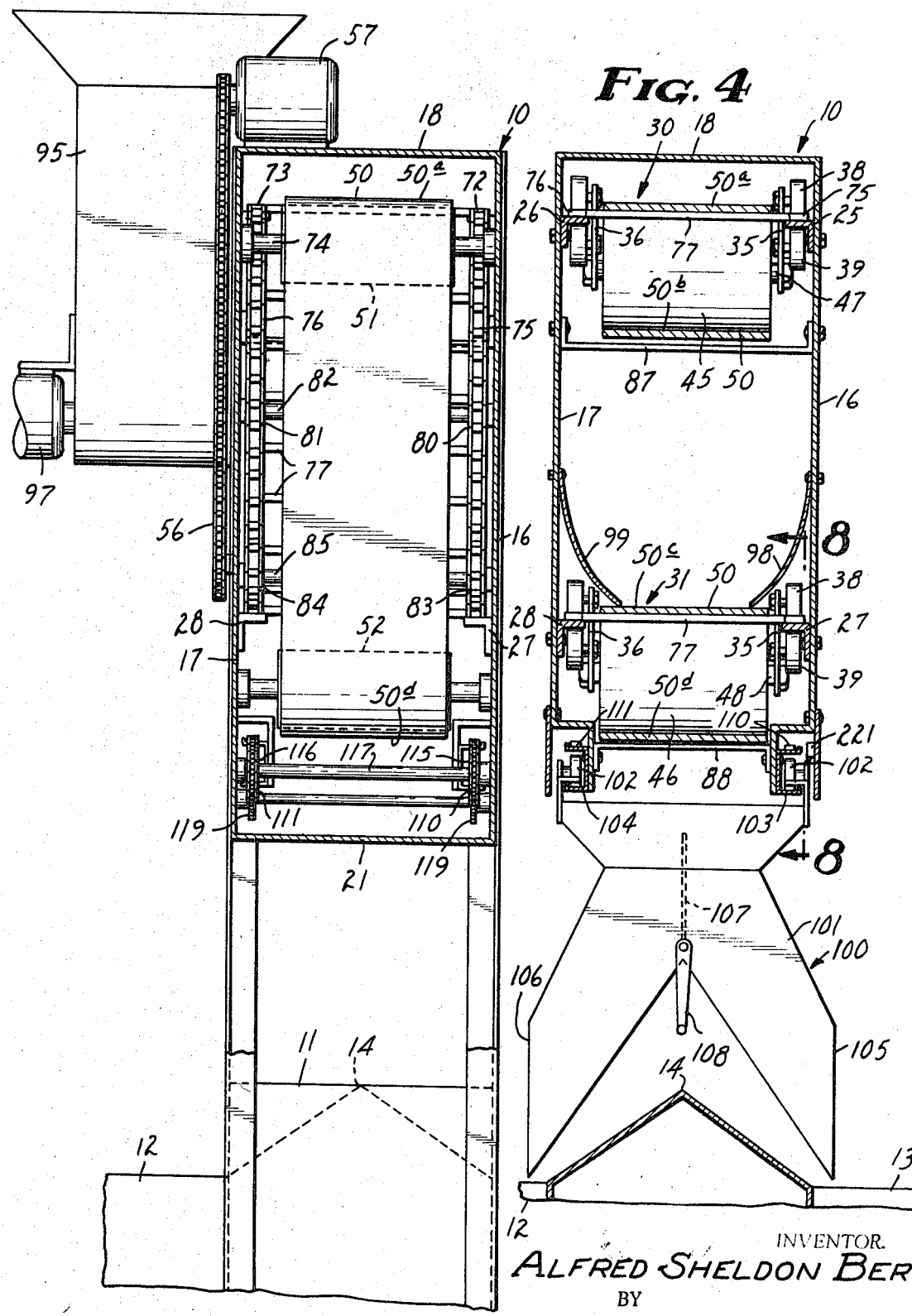

INVENTOR.
ALFRED SHELDON BERG
BY
Merchant & Gould
ATTORNEYS

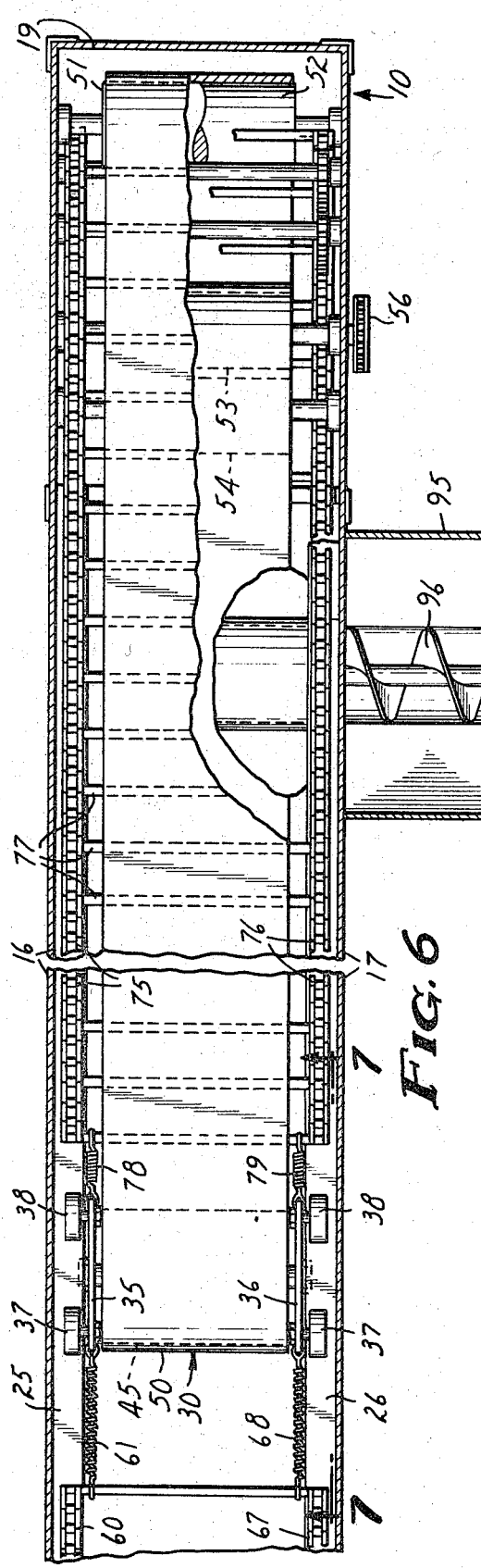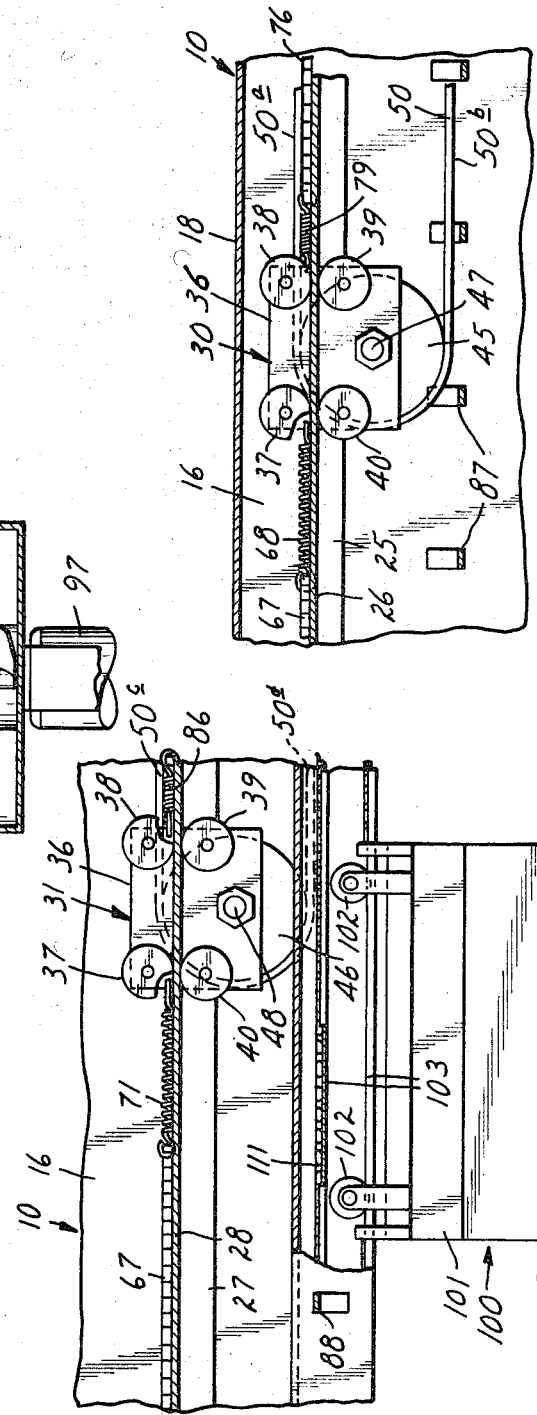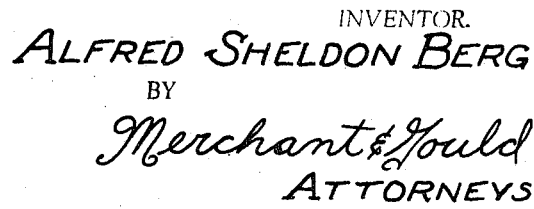

FEED DISTRIBUTING APPARATUS

BACKGROUND OF THE INVENTION

1. Field of the Invention The present invention is useful for the distribution of particulate matter into bins and the like. One example of such distribution is the even spreading of feed in livestock pens. Feeding large numbers of livestock in preparation for market requires mechanical means for the distribution of the feed and it is imperative that each pen receives a sufficient amount of feed for the livestock therein without an undue amount of waste. While the present invention will be described in conjunction with feed distribution, it should be understood that the apparatus might be utilized for the distribution of other particulate matter, which other uses will be obvious to those skilled in the art.

2. Description of the Prior Art In the prior art many extremely complicated devices are utilized to distribute feed or particulate matter into bins and the like. In general, these prior art devices utilize variable speed augers or variable speed belts having diverters in engagement therewith at predetermined intervals. These devices are generally extremely difficult to adjust and are subject to numerous other disadvantages, such as plugging, nonlinear feed distribution, extremely expensive, etc.

SUMMARY OF THE INVENTION

This invention pertains to apparatus for distributing particulate matter including first and second carriages each having a pulley rotatably mounted therein movably mounted on generally horizontally extending track means with an endless belt extending around the pulleys with a generally horizontal portion therebetween for receiving particulate matter thereon, flexible connecting means connected between the carriage means and a power means for moving the carriage means horizontally along said track means and power means for rotating said endless belt on said pulleys to drop the particulate material therefrom as the carriages move on the track means.

It is an object of the present invention to provide new and improved particulate material distributing apparatus.

It is a further object of the present invention to provide distributing apparatus which is simple and inexpensive to construct and use.

It is a further object of the present invention to provide distributing apparatus which distributes the feed in a substantially uniform predetermined pattern.

These and other objects of this invention will become apparent to those skilled in the art upon consideration of the accompanying specification, claims, and drawings.

BRIEF DESCRIPTION OF THE DRAWINGS

Referring to the drawings, wherein like characters indicate like parts throughout the FIGS.

FIG. 1 is a view in side elevation of the present distributing apparatus, some parts removed and some parts broken away and shown in section;

FIG. 2 is a view in top plan of the apparatus illustrated in FIG. 1, some parts removed;

FIG. 3 is an enlarged sectional view as seen from the line 3–3 in FIG. 1;

FIG. 4 is an enlarged sectional view as seen from the line 4–4 in FIG. 1;

FIG. 6 is an enlarged sectional view as seen from the line 6–6 in FIG. 1;

FIG. 7 is an enlarged sectional view as seen from the line 7–7 in FIG. 6;

FIG. 8 is an enlarged sectional view as seen from the line 8–8 of FIG. 4; and

DESCRIPTION OF THE PREFERRED EMBODIMENT

Figure 5:
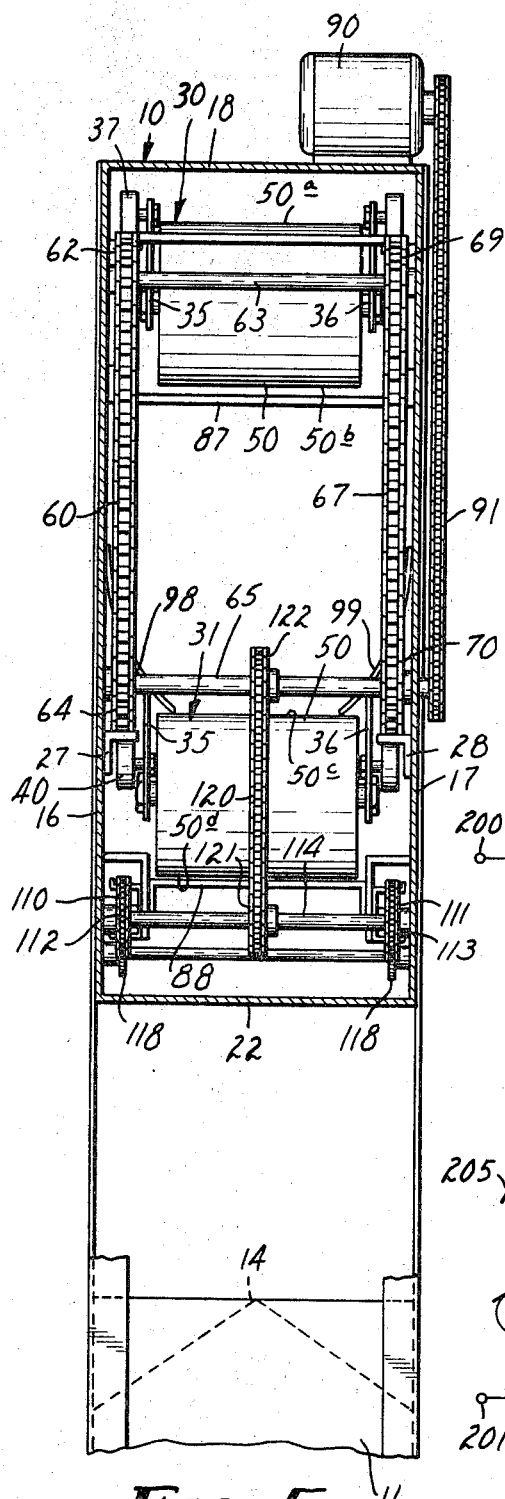
FIG. 5 is an enlarged sectional view as seen from the line 5–5 in FIG. 1.

The numeral 10 generally designates an elongated housing mounted so as to overlie an elongated bunk feeder 11 with feed troughs 12 and 13 at either longitudinal side thereof and a divider 14, having a generally triangular-shaped cross section extending upwardly therebetween so as to direct feed dropped thereon into one of the troughs 12 or 13. A plurality of partitions 15 extend outwardly from either side of the bunk feeder 11, which partitions 15 are parts of livestock pens each of which has only a portion of the bunk feeder 11 available thereto.

In general, the housing 10 includes two vertical, longitudinal side member 16 and 17 a flat top member 18 extending the length thereof and two end members 19 and 20 all affixed together by any convenient means. The bottom of the housing 10 is open except for portions 21 and 22 extending longitudinally inwardly from the end members 19 and 20, respectively, a short distance to underlie the guide and power means, which will be described presently. The lower edges of the side members 16 and 17, between the ends of the portions 21 and 22, are turned horizontally inwardly a short distance and downwardly (illustrated in FIG. 4) to form channels outwardly thereof, as will be described presently, and to form an elongated outlet for feed therebetween. It should be understood that the exact embodiment of the housing 10 may vary considerably with the different uses of the present invention and the present embodiment is illustrated only for exemplary purposes.

A pair of angle irons 25 and 26 are affixed to the inner surfaces of the side members 16 and 17, respectively, by some convenient means such as bolting or the like so as to form two inwardly extending, generally horizontal shoulders. The angle irons 25 and 26 are positioned a short distance below the top member 18 and extend from approximately vertically above the end of the portion 21 to a short distance from the end member 20. A second pair of angle irons 27 and 28 are affixed to the inner surfaces of the side member 16 and 17, respectively, so as to be spaced vertically below the angle irons 25 and 26 and approximately parallel and coextensive therewith. The angle irons 25—26 and 27—28 form two sets of tracks for two carriages 30 and 31, respectively.

The carriages 30 and 31 are substantially similar and each include a pair of side plates 35 and 36 positioned approximately parallel with the side members 16 and 17 of the housing 10 and spaced apart horizontally a distance slightly less than the distance between the outwardly extending edges of the angle irons 25—26 and 27—28. Each of the side plates 35 and 36 have four rollers 37 through 40 mounted thereon for engagement with the angle irons 25 through 28. The rollers 37 and 38 are mounted to engage the upper surfaces of the angle irons 25 through 28 and the rollers 39 and 40 engage the lower surfaces of the angle irons 25 through 28 to allow free horizontal movement of the carriages 30 and 31 along the angle irons 25—26 and 27—28 while substantially preventing vertical movement thereof. It should be understood that one skilled in the art might design carriages with different embodiments and different means for horizontal movement and all such alterations come within the scope of this invention.

Each of the carriages 30 and 31 have a large cylindrical pulley 45 and 46, respectively, rotatably mounted between the side plates 35 and 36 thereof. The pulleys 45 and 46 are mounted for rotation about a substantially horizontal axle 47 and 48, respectively, extending between the side plates 35 and 36 on each of the carriages 30 and 31. An elongated endless belt 50 having a width approximately equal to the axial length of the pulleys 45 and 46 is operatively engaged over the pulleys 45 and 46 with the central portions thereof extending toward the end member 19 of the housing 10.

A first idler pulley 51 is rotatably mounted between the side members 16 and 17 of the housing 10 adjacent the corner of the end member 19 and the top member 18. A second idler pulley 52 is mounted between the side members 16 and 17 adjacent the corner of the end member 19 and the portion 21. Three additional pulleys 53, 54, and 55 are rotatably mounted between the side members 16 and 17 and spaced vertically between the pulleys 51 and 52 and inwardly from the end member 19. The endless belt 50 extends around the pulley 45, over the top of the idler pulley 51, beneath the idler pulley 52, around the pulley 46, in a serpentine path around and between the pulleys 53 through 55 and back to the pulley 45. For simplicity during later explanations the portion of belt 50 between pulleys 45 and 51 is designated 50a, the portion between pulleys 45 and 53 is designated 50b, the portion between pulleys 46 and 55 is designated 50c, and the portion between pulleys 46 and 52 is designated 50d. The pulley 55 has a sprocket and chain 56 (see FIG. 3) attached thereto and driven by a motor 57 which is mounted on the top member 18 vertically thereabove. Therefore, energization of the motor 57 produces movement of the endless belt 50 and rotation of the pulleys 45 and 46. The pulleys 51 through 55 are mounted so that the portions of the endless belt 50a—50d are approximately horizontal.

One end of a flat-link type chain 60 is attached to the side plate 35 of the carriage 30 by a tension spring 61. The chain 60 extends along the angle iron 25 and over a sprocket 62 fixedly attached to an axle 63 rotatably mounted between the side members 16 and 17 adjacent the corner formed by the end member 20 and the top member 18. The chain 60 continues around a second sprocket 64 fixedly mounted on an axle 65 spaced vertically below the axle 63 and along the angle iron 27 where the opposite end of the chain 60 is attached to the side plate 35 of the carriage 31 by a tension spring (not shown). In a similar fashion a second chain 67, equal in length to chain 60, is attached at one end to the side plate 36 of the carriage 30 by a spring 68 and extends over a sprocket 69 mounted on the axle 63, a sprocket 70 mounted on the axle 65 and the other end is attached to the side plate 36 of the carriage 31 by a spring 71. Actually in this embodiment, the ends of the chains 60 and 67 are attached together by a rod (see FIG. 6) and the springs 61, 68, 71 and the spring not shown, are attached between the rods and the carriages 30 and 31. Thus, the chains 60 and 67 pull the carriages 30 and 31 toward the end member 20 and maintain the endless belt 50 taut.

A pair of chains 75 and 76 are connected together by a plurality of bars 77 extending between the chains in longitudinal spaced apart relationship. One end of the chains 75 and 76 is connected to the carriage 30 by means of springs 78 and 79 attached to the side plates 35 and 36 and to the endmost bar 77 extending therebetween. The chains 75 and 76 are spaced apart by the bars 77 so as to lie on the upper surfaces of the angle irons 25 and 26 and the bars 77 extending therebetween lie below the portion 5a of the endless belt 50 and provide support therefor.

A pair of sprockets 72 and 73 are mounted at either end of an axle 74 which is in turn rotatably mounted between the side members 16 and 17 adjacent but slightly lower than the idler pulley 51. A second pair of sprockets 80 and 81 are mounted at either end of an axle 82 rotatably mounted between the side members 16 and 17 approximately midway between the top member 18 and the portion 21. A third pair of sprockets 83 and 84 are attached to either end of an axle 85 rotatably mounted between the side members 16 and 17 and spaced horizontally from the ends of the angle irons 27 and 28. The chains 75 and 76 extend over the sprockets 72-80-83 and 73-81-84, respectively, after which they are positioned on the upper surfaces of the lower angle irons 27 and 28 and the free end is attached to the carriage 31 by means of a pair of tension springs 86 which are connected between the endmost rods 77 and the side plates 35 and 36 of the carriage 31. The bars 77 extending between the portions of the chains 75 and 76 lying between the carriage 31 and the sprockets 83 and 84 are positioned in supporting relationship beneath the portion 50c of the endless belt 50. A plurality of elongated braces 87 are attached between sides 16 and 17 in a spaced relationship below the angle irons 25 and 26 and spaced apart along the length thereof for supporting portion 50b of belt 50. In a similar fashion braces 88 are spaced below and along the length of angle irons 27 and 28 for supporting portion 50d of belt 50.

A motor 90, mounted on the top member 18 vertically above the sprockets 69 and 70, is attached to the axle 65 by a sprocket and chain 91. Thus, energization of the motor 90 causes rotation of the axle 65 and subsequent movement of the carriages 30 and 31 along their tracks. The motor 90 is a reversible motor and the energization thereof is dependent upon the particular distribution desired for the feed or other particulate matter. This energization will be described in detail in conjunction with FIG. 9.

A hopper 95 is attached to the outer surface of the side member 17 and a horizontally positioned auger 96 at the bottom of the hopper 95, powered by a motor 97 extends through an opening in the side member 17 above the portion 50c of the endless belt 50. As particulate matter, such as feed or the like, is supplied to the hopper 95 the auger 96 urges the particulate matter into the housing 10 where it drops onto the upper surface of the portion 50c of the endless belt 50. A pair of inwardly directed arcuate plates 98 and 99 are attached to the inner surfaces of the side members 16 and 17 and direct substantially all of the particulate matter from the auger 96 onto the upper surface of the portion 50c. Further, the arcuate plates 98 and 99 prevent the particulate matter from falling off the upper surface of the portion 50c at either side thereof. Because the rods 77 attached between the chains 75 and 76 underlie and support the portion 50c of belt 50, regardless how far it extend in the housing 10, particulate matter can be placed on the portion 50c along the entire length thereof with substantially no danger of the portion 50c sagging or becoming overloaded.

Feed directing means generally designated 100 is mounted generally below the carriage 31 for movement therewith to receive feed or other particulate matter from the portion 50c as the endless belt 50 is rotated. In the present embodiment the feed directing means 100 includes a housing 101 having an open upper end slightly wider than the distance between the lower edges of The side members 16 and 17 and sufficiently long to receive all of the feed from the upper surface of the portion 50c of the belt 50 at the carriage 31, and a plurality of wheels 102 mounted so as to project upwardly and inwardly from the upper edges of the housing 101. A pair of channel irons 103 and 104 are attached to the outer surfaces of the side members 16 and 17, respectively, adjacent the lower edges thereof with the webs of the channel irons 103 and 104 parallel to the outer surfaces of the side members 16 and 17. The wheels 102 on the housing 101 are mounted so that they ride in the channel of the channel irons 103 and 104 to allow free movement of the housing 101 therealong. The housing 101 projects downwardly and has two bifurcated outlets 105 and 106 extending generally outwardly over the feed troughs 12 and 13. A centrally located flapper valve 107 directs the feed received in the housing 101 into either of the outlets 105 or 106 by means of an external handle 108.

A pair of endless chains 110 and 111 extend the length of the channel irons 103 and 104 with the lower portion of each riding on the upper surface of the lower arm thereof and the upper portion of each riding on the upper surface of the upper arm thereof. A pair of sprockets 112 and 113 are mounted adjacent the ends of an axle 114 rotatably mounted between the side members 16 and 17 and vertically spaced below the axle 65. A second pair of sprockets 115 and 116 are mounted adjacent either end of an axle 117 rotatably mounted between the side members 16 and 17 adjacent the end member 19 and below the idler pulley 52. The chains 110 and 111 are engaged over the sprockets 112—115 and 113—116, respectively, for rotation therewith. Idler sprockets 118 and 119 are affixed to the inner surfaces of the side members 16 and 17 adjacent the ends of the channel irons 103 and 104 so as to be engaged with the chains 110 and 111 and maintain them taut. The axle 114 is operatively attached to the axle 65 by means of a chain 120 engaged over a sprocket 121 on the axle 114 and a sprocket 122 on the axle 65. The feed directing means 100 is attached to the chains 110 and 111 so as to be positioned generally below the carriage 31. Thus, as the endless belt 50 is rotated about the pulley 46 in the carriage 31, feed on the upper surface of the portion 50 falls into the housing 101 of the feed directing means 100 and is thence directed into one of the feed troughs 12 or 13. Because the chains 110 and 111 are linked directly to the chains 60 and 67, the feed directing means 100 always maintains the proper position beneath the carriage 31.

Figure 9:
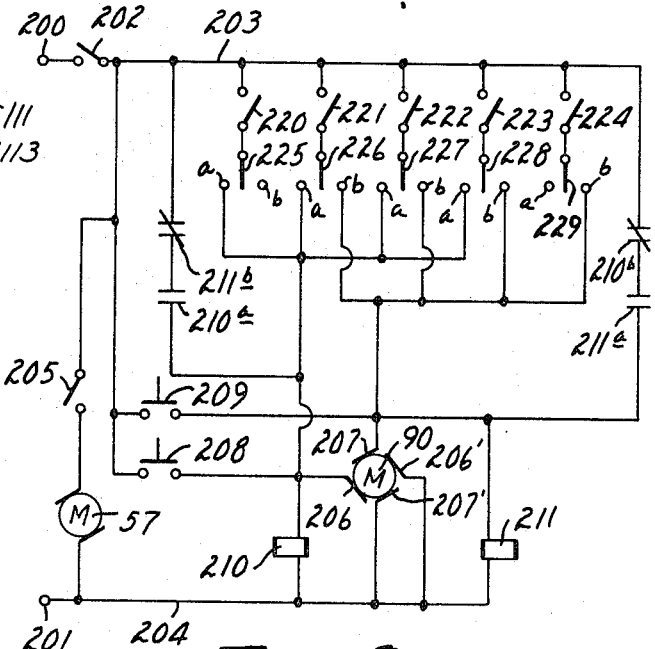
FIG. 9 is a schematic diagram of the electrical circuitry in the apparatus of FIG. 1.

Referring to FIG. 9, a pair of terminals 200 and 201 are adapted to have a suitable source of electrical power supplied thereto, such as 110 volts, 60 cycle. Terminal 200 has a manually operable switch 202 attached thereto in series with a line 203. Terminal 201 has a line 204 attached thereto. The motor 57 is connected in series with a manually operable switch 205 between the line 203 and the line 204. The motor 90 is a reversible motor having two pairs of brushes 206–206' and 207–207' therein. The brushes 206' and 207' are connected directly to the line 204. The brush 206 is connected through a reversing pushbutton switch 208 to the line 203. The brush 207 is connected through a forward pushbutton 209 to the line 203. A relay coil 210 is connected between the brush 206 and the line 204, and a second relay coil 211 is connected between the brush 207 and the line 204.

A pair of normally open contacts 210a, associated with the relay coil 210, are connected in series with a pair of normally closed contacts 211b, associated with the relay coil 211, between the brush 206 and the line 203. A pair of normally open contacts 211a, associated with the relay coil 211, are connected in series with a pair of normally closed contacts 210b, associated with the relay coil 210, between the brush 207 and the line 203. Five normally open limit switches 220 through 224 are connected between the line 203 and the movable contacts of five single-pull double-pull switches 225 through 229. The two stationary contacts of each of the switches 225 through 229 are designated a and b. The stationary contact a of the switches 225 through 228 are connected together and to the brush 206 of the motor 90. The stationary contacts b of the switches 226 through 229 are connected together and to the brush 207 of the motor 90. The stationary contact b of the switch 225 and the stationary contact a of the switch 229 have no connections thereto.

To operate the apparatus, the switch 202 is closed manually and thereafter the switch 205 is closed. This provides electrical energy to the motor 57, which causes movement of the endless belt 50. The various limit switches 220 through 224 are mounted at the ends of the pens, as for example, the limit a switch 220 is mounted vertically above the last partition 15 at the right of FIG. 1, and the limit switch 224 is mounted vertically above the last partition 15 at the left of FIG. 1. All of the limit switches 220 through 224 are mounted so that the leading edge, determined by the particular direction of movement, of the feed directing means 100 engages and closes the switch. The motor 90 may be operated manually be depressing either the reverse pushbutton switch 208 or the forward pushbutton switch 209 which upon closing completes a circuit through the relay coil 210 or 211, respectively. Energizing the coils 210 or 211 completes a circuit through the contacts 211 b and 21 210a to the brushes 206–206' of the motor 90, or the contacts 210b and 211a to the brushes 207–207' of the motor 90 respectively. Since the coils 210 and 211 are connected in parallel with the brushes 206 and 207, energization of either of the coils 210 or 211 causes the circuit to be locked in and the motor 90 continues to operate in that direction until the manual switch 202 is operated, or the opposite pushbutton 208 or 209 is operated.

If the operator wishes to automatically distribute feed in a particular pen, rather than throughout the feeder 11, he can simply close a certain combination of the single-pole double-throw switches 225 through 229, and the motor 90 will be automatically reversed at either end of the pen. For example, moving the movable contact of the switch 225 into engagement with the stationary contact a and the movable contact of the switch 229 into engagement with the stationary contact b, will cause automatic reversal of the motor 90 as the feed directing means 100 reaches the partition 15 and closes the limit switch 220 as well as when it reaches the furtherest partition 15 and closes the limit switch 224. In a similar fashion, if the operator wishes to distribute feed in a single pen at the left of the apparatus, the movable contact of the switch 225 is placed in engagement with the stationary contact a, while the movable contact of the switch 226 is placed in engagement with the stationary contact b. The motor 90 will then reverse each time the feed directing means 100 strikes one of the limit switches 220 or 221. Any other combination of the switches 225 through 229 can be made to cause automatic reversal of the motor 90 and oscillation of the feed directing means 100 over any desired portion of the feeder 11.

Springs 61, 68, 71, 78, 79, 86 and the two not shown, are provided to allow for expansion and contraction of the endless belt 50 during changes of ambient temperature or due to age and the like. Further, it has been found through experimentation that driving the endless belt 50 with an inner pulley, such as pulley 55, rather than an outer pulley, such as pulley 51 or 52, has a tendency to stabilize the speed of the endless belt 50 during operation of the motor 90. Thus, the feed supplied to the feed directing means 100 remains relatively constant regardless of the direction of movement of the carriages 30 and 31. Although the present embodiment is illustrated with the guide and power means located at particular positions, it should be understood that various types of power means and guiding pulleys etc., might be placed at various positions by those skilled in the art and so accomplish the functions of the present invention.

While I have shown and described a specific embodiment of this invention, further modifications and improvements will occur to those skilled in the art. I desire it to be understood, therefore, that this invention is not limited to the particular form shown and I intend in the appended claims to cover all modifications which do not depart from the spirit and scope of this invention.

I claim:
1. Particulate material distributing apparatus comprising:
   a. first and second carriage means each having a pulley rotatably mounted therein;
   b. generally horizontally extending track means;
   c. means mounting said first and second carriage means on said track means for movement therealong;
   d. first power means connected to said first and second carriage means for moving said carriage means along said track means and maintaining a predetermined spatial relationship therebetween relative to said track means;
   e. endless belt conveyor means;
   f. means operatively mounting said conveyor means on said pulleys in said carriage means so that a portion thereof is substantially horizontal for receiving particulate material thereon; and
   g. second power means operatively connected to said conveyor means for producing movement thereof about said pulleys with proper energization of said second power means; and
   h. means for receiving material from said conveyor means and directing said material transversely of the longitudinal dimension of the track means, said receiving means being mounted vertically lower than said conveyor means and adjacent one of the pulleys for receiving material therein upon movement of the conveyor means about said one pulley.

2. Particulate material distributing apparatus as set forth in claim 1 wherein the track means includes two horizontal tracks positioned in generally vertical overlying relationship with each track having one of said carriage means mounted thereon.

3. Particulate material distributing apparatus as set forth in claim 1 having in addition means for introducing particulate matter onto the horizontal portion of said conveyor means, said additional means being fixedly mounted adjacent one end of said track means.

4. Particulate material distributing apparatus as set forth in claim 1 having in addition means disposed below the substantially horizontal portion of the conveyor means for supporting said portion and mounting said portion substantially horizontal when particulate matter is deposited thereon.

5. Particulate material distributing apparatus comprising:
   a. a housing;
   b. first and second carriage means each having a pulley rotatably mounted therein;
   c. first and second tracks mounted within said housing with said first track spaced from and vertically overlying said second track;
   d. means mounting said first carriage on said first track and said second carriage on said second track for movement therealong said carriage means being further mounted with the rotational axes of said pulleys generally horizontal and transverse to the longitudinal dimension of said tracks;
   e. flexible connecting means attached adjacent one end to said first carriage means and adjacent the other end to said second carriage means for producing simultaneous movements of said first and second carriage means in opposite directions;
   f. first guide and power means attached to said housing adjacent one end of said first and second tracks and engaging said flexible connecting means for moving one of said carriage means toward the one end of the first and second tracks;
   g. an endless belt operatively mounted on said pulleys; and
   h. second guide and power means attached to said housing adjacent the other end of said first and second tracks and engaging said endless belt for maintaining a lower portion thereof generally horizontal and for producing movement thereof about said pulleys with power energization of said second guide and power means;
   i. switching means operatively controlling said first guide and power means for producing reciprocating movements along any desired one of a plurality of predetermined paths; and
   j. particulate material supplying means affixed to said housing for receiving particulate material and directing the material onto the upper surface of said horizontal lower portion of said endless belt.

6. Particulate material distributing apparatus as set forth in claim 5 wherein the flexible connecting means includes spring means mounted to cooperate for changes in length of said endless belt during temperature changes and to maintain said endless belt taut.

7. Particulate material distributing apparatus as set forth in claim 5 wherein a portion of the flexible connecting means extends generally horizontal and adjacent the lower generally horizontal portion of the endless belt and includes support means for maintaining said lower generally horizontal portion generally horizontal when particulate material is deposited thereon.